United States Patent [19]

Foster et al.

[11] 3,896,828

[45] July 29, 1975

[54] TREATMENT OF PICKLE LIQUOR RINSE WATER

[75] Inventors: James J. Foster, Homewood, Ill.;
Richard J. Sittema, Munster, Ind.;
Russell E. Nelson, Riverdale, Ill.

[73] Assignee: Interlake, Inc., Chicago, Ill.

[22] Filed: Oct. 23, 1973

[21] Appl. No.: 408,654

[52] U.S. Cl.............. 134/57 R; 134/60; 134/64; 134/109
[51] Int. Cl.............................. B08b 3/10
[58] Field of Search............ 134/57 R, 60, 64, 104, 134/109, 122

[56] References Cited
UNITED STATES PATENTS

| | | |
|---|---|---|
| 1,539,993 | 6/1925 | Conley et al................ 134/64 X |
| 1,544,506 | 6/1925 | Tytus....................... 134/60 UX |
| 2,697,050 | 12/1954 | Barnes..................... 134/60 X |
| 2,721,562 | 10/1955 | Irvine...................... 134/60 |
| 2,927,871 | 3/1960 | Mancke et al........... 134/57 R X |
| 3,000,385 | 9/1961 | Shay........................ 134/64 X |

FOREIGN PATENTS OR APPLICATIONS

| | | | |
|---|---|---|---|
| 130,762 | 10/1959 | U.S.S.R.................. | 134/64 |

*Primary Examiner*—Robert L. Bleutge
*Attorney, Agent, or Firm*—Prangley, Dithmar, Vogel, Sandler & Stotland

[57] ABSTRACT

A system for treating rinse water produced in rinsing metal strapping emerging from an acid pickling tank. The system includes first and second dunk rinse tanks and a treatment tank to which the rinse water is transported from the first rinse tank and reacted with sodium hydroxide to precipitate iron from the rinse water in the form of magnetite. Clarified water is transported to a storage tank and from there recycled to the first and second rise tanks to limit the production of waste from the system. Treatment of the waste rinse water with sodium hydroxide results in the use of lower temperatures, shorter residence time and enlarges the acceptable pH range for the reaction.

15 Claims, 11 Drawing Figures

TREATMENT OF PICKLE LIQUOR RINSE WATER

BACKGROUND OF THE INVENTION

During the production of metal strapping surface impurities and the like must be removed from the metal strapping prior to shipment thereof. The strapping is passed through an acid pickling bath which must be rinsed from the metal strapping to prevent the metal strapping from rusting. Rinsing the metal strapping usually involves a continuous process wherein large amounts of water are used to rinse the acid from the strapping with the waste water being discharged to disposal systems such as city sewers and the like. Due to increased pollution control standards, discharging waste rinse water to public sewers has in many cases become illegal.

Since some of the chemical compounds present in the waste rinse water are also present in the pickle liquor, processes heretofore used to clean the pickle liquor were examined in order to determine if they were applicable to treating the waste rinse water. U.S. Pat. No. 3,434,797 issued Mar. 25, 1969 to Taylor and Krikau disclosed a method for treating pickle liquor by the addition thereto of a lime slurry. The pickle liquor and lime slurry are maintained at a pH of from 8 to 10 at a temperature from about 180°F. to 210°F. for at least 5 hours. While this process may be satisfactory with small volumes of waste pickle liquor, this process is unsatisfactory for the large volumes of waste rinse water produced in the cleaning of metal strapping.

SUMMARY OF THE INVENTION

This invention relates to a system for rinsing metal strapping emerging from an acid pickling bath and more particularly for a system for treating the rinse water used in rinsing the strapping and for reducing the volume of waste material produced therefrom.

It is a general object of the present invention to provide a system and for rinsing metal strapping emerging from an acid pickling bath which reduces the amount of waste material produced and reduces the residence time of the rinse water in the treatment tank and reduces the temperatures at which the rinse water must be maintained and enlarges the acceptable pH range in which the treatment reaction takes place.

It is an important object of the present invention to provide a system for rinsing metal strapping emerging from a hydrochloric acid pickling bath, the system comprising a first rinse bath and a second rinse bath in communication with the first rinse bath, a rinse water treatment tank in communication with the first rinse bath, a clarified water storage tank in communication with the rinse water treatment tank and with the first rinse bath and the second rinse bath, means for passing the metal strapping emerging from the hydrochloric acid pickling bath through the first rinse bath and the second rinse bath, means for rinsing the metal strapping emerging from the first rinse bath with clarified water from the clarified water storage tank, means for rinsing the metal strapping emerging from the second rinse bath with fresh water, mechanism for adding a sodium hydroxide solution to the rinse water from the first rinse bath, and means for removing precipitated magnetite from the rinse water treatment tank to maintain the liquid level in the rinse water treatment tank within predetermined limits, whereby a continuous system for rinsing metal strapping is provided with the introduction of fresh water thereto and the removal of waste material therefrom being limited.

Another object of the present invention is to provide a system of the type set forth wherein there is provided pumping mechanism to remove the precipitated magnetite and control mechanism responsive to the level of clarified water in the clarified water storage tank for actuating the pumping mechanism to remove the precipitated magnetite from the rinse water treatment tank to maintain the level of rinse water in the rinse water treatment tank and the level of clarified water in the clarified water storage tank within predetermined limits.

Yet another object of the present invention is to provide a system of the type set forth wherein a control mechanism is responsive to the pH of the clarified water in the clarified water storage tank for controlling the amount of sodium hydroxide added to the rinse water to maintain the pH of the rinse water from the first rinse bath within a predetermined range.

These and other objects of the present invention together with further objects and advantages thereof will best be understood by reference to the following specification taken in connection with the accompanying drawings:

DESCRIPTION OF THE PREFERRED EMBODIMENT

Figure 1:
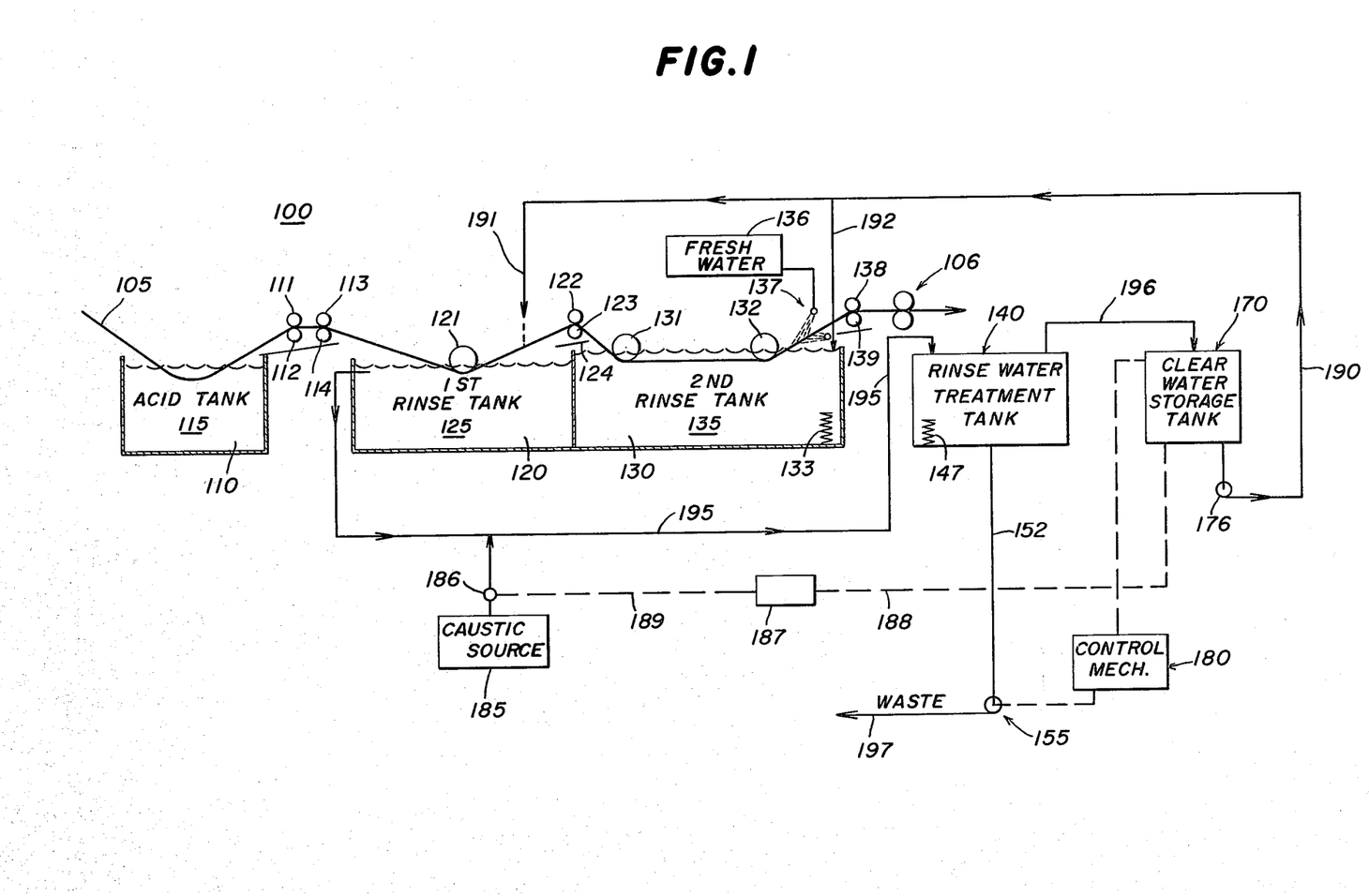
FIG. 1 is a schematic diagram of the system of the present invention showing the direction of the metal strapping travel as well as the relationship between the various components of the system.

Referring now to the drawings, there is disclosed a system 100 for rinsing metal strapping 105 transported through the system by means of powered rollers 106. The metal strapping passes from an acid tank 110 through a first rinse tank 120 into and out of a second rinse tank 130. More particularly, there are provided squeegee rollers 111 and 112 and squeegee rollers 113 and 114 adjacent the exit of the metal strapping 105 from the acid tank 110 to minimize the amount of acid drag-over from the tank 110 to the bath 120. The metal strapping 105 passes from the acid tank 110 and the hydrochloric liquid 115 therein to the tank 120 wherein it passes underneath an immersion roller 121 so that the strapping 105 is completely submerged within the liquid 125 in the tank 120. Squeegee rollers 122 and 123 are provided at the exit end of the tank 120 to minimize the amount of liquid drag-over from the tank 120 to the tank 130. To this end, a tray 124 is positioned so that liquid removed from the strapping 105 by the squeegee rollers 122 and 123 falls back into the tank 120.

The metal strapping 105 passes from the tank 120 into the tank 130 and more particularly underneath a pair of immersion rollers 131 and 132 positioned so that the strapping 105 is completely submerged in the liquid 135 present in the tank 130. A heater such as a steam sparge 133 is positioned within the second tank 130 to provide the necessary operating temperatures for the liquid in the tank. A fresh water source 136 is positioned above the exit end of the tank 130 to contact and rinse the metal strapping 105 as it emerges from the liquid 135 in the tank 130. The fresh water is applied to the strapping 105 in the form of spacedapart sprays 137 positioned to spray the water on the strapping 105 in a direction as shown, that is toward the first tank 120. Spraying the strapping 105 with fresh water in this manner provides for significantly improved rinsing of the strapping as compared to other configurations wherein rusting may occur at slow strap travel speeds or when the line is shut down. Spaced apart squeegee rollers 138 and 139 are positioned adjacent to the exit end of the tank 130 to minimize the amount of liquid carried out of the tank 130 by the strapping 105. The strapping 105 after it leaves the second rinse tank 130 may be coiled or otherwise treated.

Figures 2, 3:
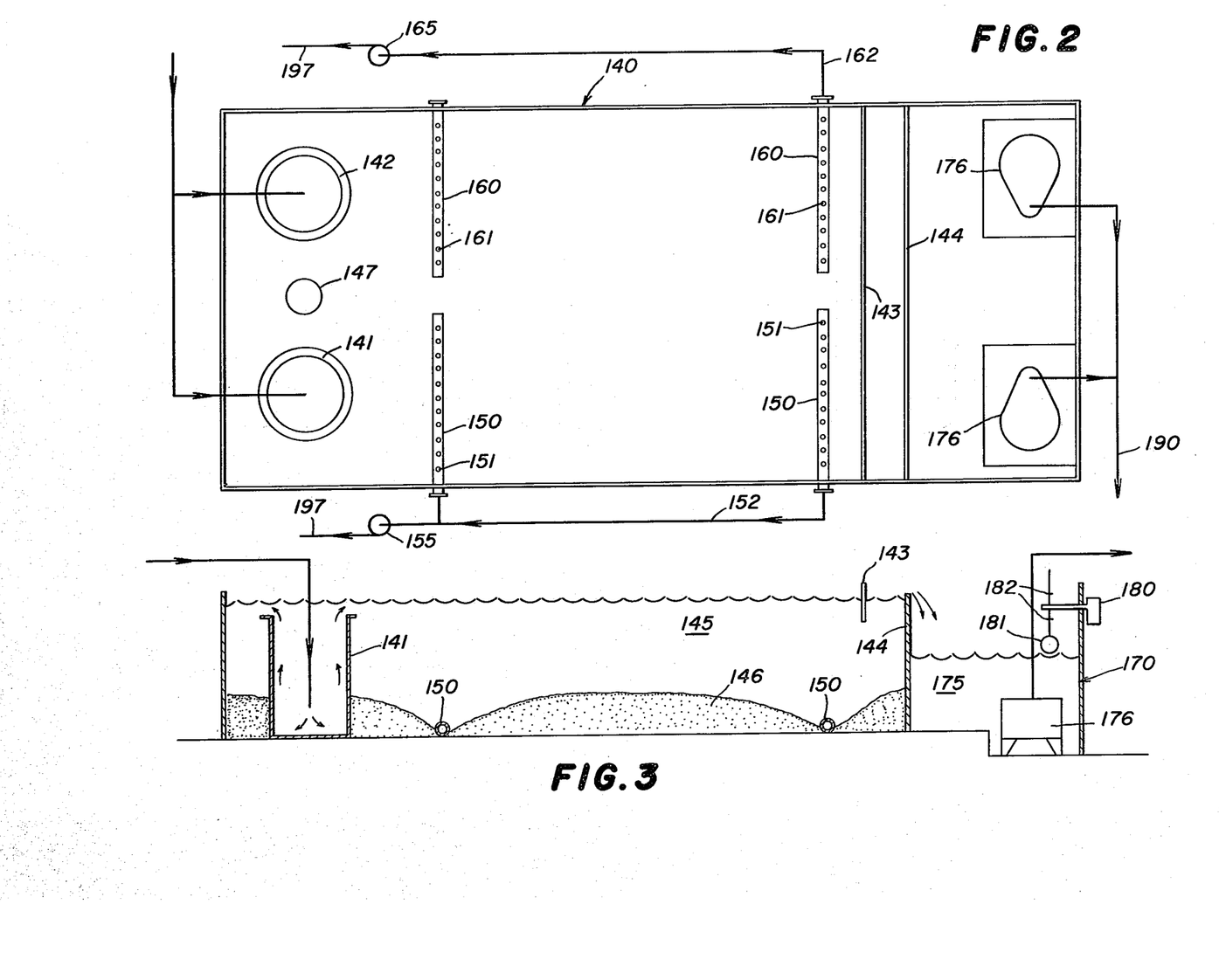
FIG. 2 is a top elevational view of the rinse water treatment tank and clarified water storage tank used in the system of the present invention.
FIG. 3 is a side elevational view of the rinse water treatment tank and clarified water storage tank used in the system of the present invention.

A rinse water treatment tank 140 is provided and has a total capacity of about 8600 gallons. Two receiving containers 141 and 142 are positioned near the entrance end of the tank 140 with each of the receiving containers being cylindrical in shape and being open at the top thereof. A scum baffle 143 is positioned adjacent to the exit end or weir 144 of the tank 140 and extends entirely across the width thereof and below the normal operating liquid level in the tank, the liquid 145 being maintained at a level as hereinafter set forth. Due to a chemical reaction which takes place in the tank 140, magnetite, that is $Fe_3O_4$, precipitates from the liquid in the tank and forms a solid phase 146 at the bottom of the tank. A heater 147 such as a steam sparge is provided in the tank 140. The tank 140 has outlet pipes 150 in the form of apertured conditions, the apertures 151 being of substantial dimension to accommodate the passage of the solids 146 therethrough. The outlet pipes 150 are located at the bottom of the tank 140 and are connected by a pipe 152 to a pump 155 which serves to suck the sludge or solids 146 out of the bottom of the tank 140. It is noted that two outlet pipes 150 are employed to remove solids 146 and to prevent solids accumulation in the tank 140. Similarly, spaced apart apertured pipes 160 are provided on the other side of the tank 140, the apertures 161 being of the same dimension as the apertures 151. The outlet pipes 160 are connected to a line 162 in communication with a suction pump 165 which removes the solids 146 in the form of a sludge from the bottom of the tank 140 as hereinbefore set forth.

A clarified water storage tank 170 having a capacity of 1400 gallons is positioned adjacent to the tank 140 and in fact is fed from the tank 140 by overflow of the liquid 145 in the tank 140 over the weir 144 and into the tank 170. The clarified water 175 in the tank 170 is pumped out of the tank by two pumps 176. The pumps 176 operate continuously so long as metal strapping 105 is passing through the system 100.

A control mechanism 180 in the clarified water storage tank 170 includes a level sensing mechanism in the form of a float 181 having upper and lower spaced apart switching devices 182 thereon. The control device 180, as seen particularly in FIG. 1, is operatively connected to the pumps 155 and 165 which function to remove the solids 146 in the bottom of the treatment tank 140. A caustic soda source 185 is operatively connected to a line 195 which leads from the outlet of the first rinse tank 120 to the inlet of the rinse water treatment tank 140 and more particularly the line 195 leads to the two receiving containers 141 and 142. A valve 186 is intermediate the caustic soda source 185 and the line 195 and is operatively connected to a control mechanism 187 by suitable electrical leads 189. The control mechanism 187 is connected to a pH meter (not shown) situated in the clarified water storage tank 170 and more particularly in position to measure the pH of the clarified water 175 therein. Suitable electrical leads 188 connect the pH meter in the clarified water tank 170 with the control mechanism 187.

The system 100 and particularly the individual components thereof are connected as follows: A pipe 190 is connected to both of the pumps 176 in the clarified water storage tank 170 and extends from the clarified water storage tank to the first rinse tank 120 where a tap 191 is positioned above the metal strapping 105 as it exits or emerges from the liquid 125 in the first rinse tank. Clarified water flowing from the tap 191 rinses the metal strapping and thereafter falls into the first rinse tank 120, the tray 124 and the squeegee rollers 122 and 123 serving to prevent drag-over from the first tank 120 to the second tank 130. The pipe 190 has another tap 192 which serves to introduce clarified water as make-up to the second rinse tank 130, the clarified water being introduced directly to the rinse tank 130 without contacting the metal strapping 105 emerging therefrom. The line 195 previously discussed leads from the exit of the first rinse tank 120 to the rinse water treatment tank 140 and more particularly to the two receiving containers 141 and 142 therein. A line 196 represents a flow-over from the rinse water treatment tank 140 to the clarified storage tank 170, when in fact the weir 144 serves to provide the necessary flow path between the tank 140 and the tank 170. Two pipes 197 lead out of the treatment tank 140 and more particularly they are downstream of the pumps 155 and 165 and transport the magnetite sludge removed from the tank 140 by the pumps 155 and 165 to the waste acid storage tank (not shown).

Operation of the system 100 is as follows. The heater 147 in the tank 140 is actuated to raise the temperature of the liquid 145 in the tank to a temperature in the range of from about 150° to about 180°F. and the heater 133 in the tank 130 is actuated to raise the temperature of the liquid 135 to a temperature of about 190°F. When the pumps 176 are actuated, the flow of the system begins and after a predetermined start-up time the temperatures of the first rinse tank 120, the second rinse tank 130, the treatment tank 140 and the clarified water tank 170 are attained. The clarified water 175 from the tank 170 is pumped by the pumps 176 through the line 190 and is introduced directly into the second rinse tank 130 through tap 192 as make-up water for that tank whereas the clarified water 175 is introduced into the first tank 120 after it has flowed through the tap 191 to rinse the metal strapping 105 emerging from the first rinse tank. The mechanism 106 is activated in order to draw metal strapping 105 from the acid tank 110 through the squeegees 111 to 114 and into the first rinse tank 120. The metal strapping 105 is completely submerged in the first rinse tank by passing underneath the immersion roller 121 in order to contact the rinse solution 125 in the first rinse tank 120.

The rinse solution in the first rinse tank 120 is maintained at a temperature in the range of from about 150° to about 170°F., iron being present in an amount of about 200 parts per million while the chloride content is about 2500 parts per million. The pH is maintained at about 9. Since there is about 12 weight percent hydrochloric acid in the tank 110 and about 5 percent iron in the tank, some of the drag-over from the acid tank 110 to the first rinse tank 120 accounts for the high chloride content in the first rinse tank. The recirculated clarified water 175 enters the first rinse tank at a flow rate of about 10 gallons per minute to rinse the metal strapping 105 emerging from the first rinse tank and before it passes through the squeegees 122 and 123, the tray 124 being provided to ensure that liquid removed by the squeegees falls back into the first rinse tank 120 and does not contaminate the second rinse tank 130.

The metal strapping 105 is completely submerged in the second rinse tank 130 and more particularly submerged in the liquid 135 therein, this being accomplished by the two immersion rollers 131 and 132. Upon exiting from the liquid 135 in the second rinse tank 130, the metal strapping 105 is rinsed with fresh water from the source 136 thereof by a plurality of spaced apart sprays 137. The sprays 137 are angularly positioned toward the acid tank 110 and serve to clean the remaining salt from the metal strapping 105. Squeegees 138 and 139 are provided to minimize liquid drag-out from the tank 130. The liquid 135 in the tank 130 is maintained at a temperature of about 190°F. which may be accomplished by activation of the heater 133 therein, this heater also being a steam sparge. The iron content of the liquid 135 is about 25 parts per million and the chloride content is about 2000 parts per million. The pH of the second rinse bath 130 is maintained above about 9.5. The fresh water rinse 136 is regulated to provide a flow rate of about 10 gallons per minute while the tap 192 is regulated to provide a flow rate of clarified water 175 of about 10 gallons per minute. It is seen, therefore, that about 20 gallons per minute of liquid 135 flows from the tank 130 into the tank 120. Since 10 gallons per minute are added to the tank 120 from the clarified water tank 170, the flow rate of liquid out of the rinse bath 120 to the treatment tank 140 is about 30 gallons per minute.

The liquid flowing out of the first rinse bath 120 is conducted via the pipe 195 to the rinse water treatment tank 140. Caustic soda from the source 185 thereof is added to the pipe 195 as a 25 percent solution in water, the flow rate of the caustic soda added being determined by the control mechanism 187 as hereinafter set forth. The pipe 195 conducts equal amounts of the liquid from the rinse tank 120 to the spaced apart receiving containers 141 and 142 in the tank 140. The purpose of the receiving containers 141 and 142 is to reduce the turbulence of the liquid 145 in the tank 140 by preventing splashing and the like. Since the pipe 195 extends downwardly into the tank 140 and near the bottom of each of the containers 141 and 142 and the liquid fills both of the containers 141 and 142 and overflows the tops thereof, it is seen that substantial amounts of turbulence are prevented. As the liquid 145 in the tank 140 flows out of the containers 141 and 142, the chemical reaction between the constituents of the liquid and more particularly the iron chloride therein and the sodium hydroxide added from the caustic soda source 185 takes place. By maintaining the liquid 145 at the proper temperature and the proper pH, all as hereinafter will be described, for a sufficient amount of time, magnetite will precipitate and fall to the bottom of the tank as solids 146. Since the dwell or residence time of the liquid 145 in the tank 140 is about 30 minutes there is sufficient time for a substantial amount of the iron in the liquid 145 to be reacted with the sodium hydroxide and to precipitate from solution in the form of the solid magnetite 146. The outlet pipes 150 and 160 are spaced apart and extend substantially all the way across the tank 145 to provide good distribution in the tank for removing the solids 146 therefrom. A scum baffle 143 near the exit end of the tank 140 prevents floating debris and the like from flowing over the weir 144 into the clarified water tank 170.

As the clarified water flows over the weir 144 into the clarified water storage tank 170, the level of clarified water 175 in the tank rises. The control mechanism 180 is set so that when the level of the clarified water 175 in the tank 170 is about 1 inch below the top of the weir 144, the float mechanism 181 and more particularly the lower switch 182 is activated thereby to actuate the pumps 155 and 165 which suck the magnetite 146 out of the bottom of the tank 140. Naturally, a certain amount of the liquid in the tank 140 is removed with the solid magnetite and this reduces the level of liquid 145 in the tank 140 until the level is below the top of the weir 144 and clarified water ceases to flow over the weir 144 into the tank 170. The float 181 thereafter moves downwardly with the level of the liquid 175 in the tank 170 since the pumps 176 operate continuously. When the level of the liquid 175 in the tank 170 and, therefore, the float 181 reach a point about 12 inches below the top of the weir 144, the upper switch 182 is activated to deactivate the pumps 155 and 165 thereby allowing the level of the liquid 145 in the tank 140 to rise. It is seen, therefore, that the control mechanism 180 serves to maintain the level of liquid in the tank 170 between predetermined limits by actuating the pumps 155 and 165 to remove solids 146 and liquid 145 from the tank 140 in response to the level of liquid 175 in the tank 170.

The control mechanism 187, as hereinbefore set forth, is responsive to the pH of the clarified water 175 present in the tank 170, and is effective to control the valve 186 thereby to feed more or less sodium hydroxide into the pipe 195. Preferably, the entire system 100 is operated at a pH greater than 9 and this is effected by maintaining a pH in the clarified water 175 greater than about 10.5. As hereinafter will be explained, proper use of temperature and the sodium hydroxide in the treatment tank 140 permits pH levels higher than 11 to be used without deleterious affect to the reaction taking place in the tank 140 to produce the clarified water. This is a significant advantage over prior art processes wherein the pH necessarily had to be controlled within narrow limits since more sophisticated and expensive control equipment would be required than in the present invention. in the present system, the clarified water 175 can be produced by the precipitation of magnetite in the form of the solids 146 when the liquid 145 in the tank 140 is maintained at pH's of about 9 and higher, although as hereinafter set forth the reaction will take place at pH's as low as 7.

As previously discussed herein the flow rate from the tank 170 is about 20 gallons per minute which is divided in half, 10 gallons per minute being introduced into the first rinse bath 120 and 10 gallons per minute being introduced into the second rinse bath 130. A fresh water addition of 10 gallons per minute is added to the second rinse bath 130 thereby producing a flow rate out of the first rinse bath of 30 gallons per minute. Obviously, an average of about 10 gallons per minute must be removed from the rinse water treatment tank 140 in order to maintain constant the total amount of liquid in the system 100. In practice, the rinse water treatment tank 140 in combination with the clarified water storage tank 170 accommodates the output from five separate rinse lives. In an actual example, the rinse water treatment tank 140 receives about 200 gallons per minute input while the waste production is at the rate of about 70 gallons per minute. It is seen, therefore, that the volume in gallons of waste produced for each minute of operation is about 0.833 percent of the volume of the treatment tank which is 8400 gallons. The system was initially designed to produce some 500 gallons per minute of waste which figures out to be a production in volume per minute of about 6 percent of the volume of the tank 140. It is seen, therefore, that although the system 100 was initially designed to accommodate a volume of waste per minute of about 6 percent of the volume of the treatment tank, in fact the amount of waste produced per minute is about 0.833 percent of the volume of the treatment tank, a significant improvement over design expectations. With the system 100 of the present invention the liquid 125 present in the first rinse bath 120 has an iron content of about 200 parts per million whereas the clarified liquid 175 in the tank 170 has an iron content in the range of from about 20 to about 25 parts per million, thereby representing a substantial removal of iron from the rinse liquid. Since some rinse liquid in the tank 140 is removed when the pumps 155 and 165 are actuated, the concentration of chloride in the system is maintained below 2500 parts per million, another important feature of the present invention.

The entire system 100 would not be operable were it not for the rapid precipitation of magnetite in the tank 140 since the dwell time in the tank 140 is only about 30 minutes. As hereinbefore discussed, the prior art taught a reaction wherein the settling time required to precipitate and remove the magnetite was in the order of 5 hours. It is seen, therefore, that the present invention provides a ten-fold reduction in time necessary to precipitate sufficient magnetite from the solution 145 to provide the clarified liquid 175 having an iron content in the range of from about 20 to about 25 parts per million.

Figure 4:
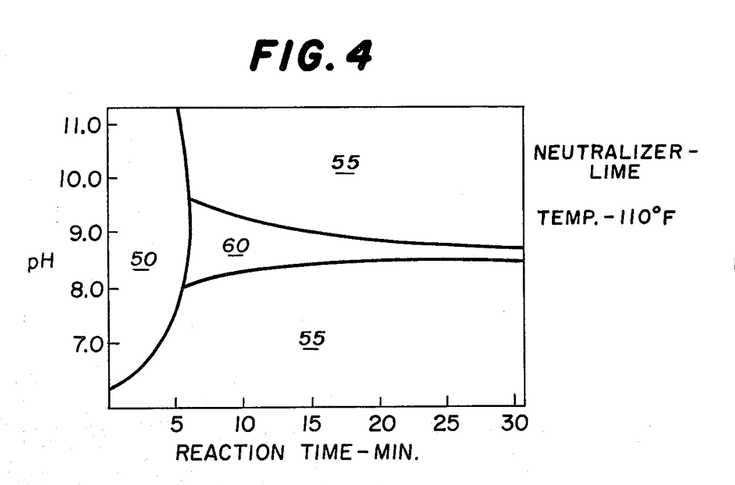
FIGS. 4 through 7 are graphical representations of experimental data developed in treating rinse water with lime at various temperatures and the pH's for various times.

Referring now to FIGS. 4 to 7 of the drawings, there is disclosed experimental data wherein an iron chloride containing solution was reacted with lime at various temperatures and pH values to determine the requisite parameters to produce the desired magnetite. Referring specifically to FIG. 4, it is seen that the area labeled 50 represents ferrous hydroxide which is green in color and readily determined by visual observation. As a sufficient amount of the lime is added to produce a pH in the range of from about 7 to 11 the ferrous hydroxide 50 is produced from the ferrous chloride present at lower pH values. As the reaction takes place and the pH drops below about 8, ferric hydroxide 55 is produced, the ferric hydroxide being orange in color and readily determined by visual observation. Ferric hydroxide 55 is not suitable for attaining the purposes of the present system 100 since the ferric hydroxide does not settle out of solution but remains dispersed therein. Similarly, if the pH rises above about 9, ferric hydroxide 55 is again produced. It is seen, therefore, that only a very narrow range of pH's that being between about 8 and about 9 is suitable to produce the magnetite 60 which will precipitate out of solution when the neutralizer is lime and the temperature is maintained at 90°F.

Figure 5:
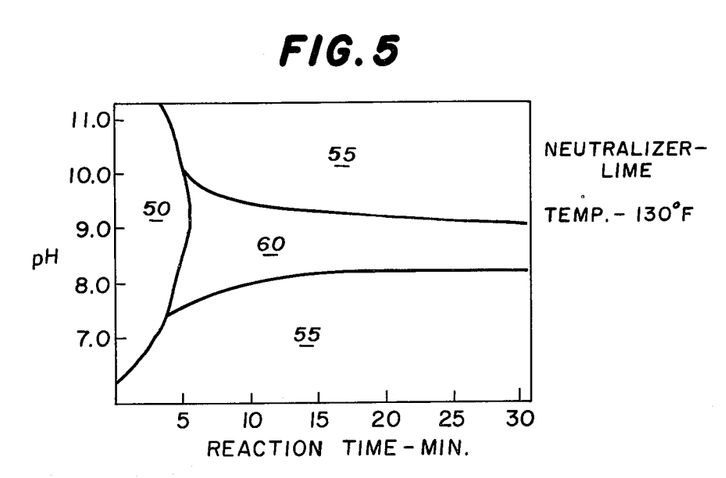
Figure 6:
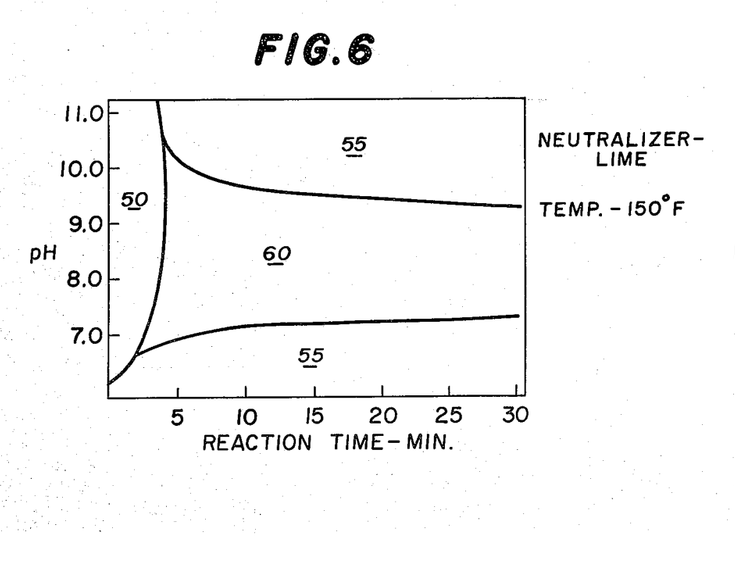
Figure 7:
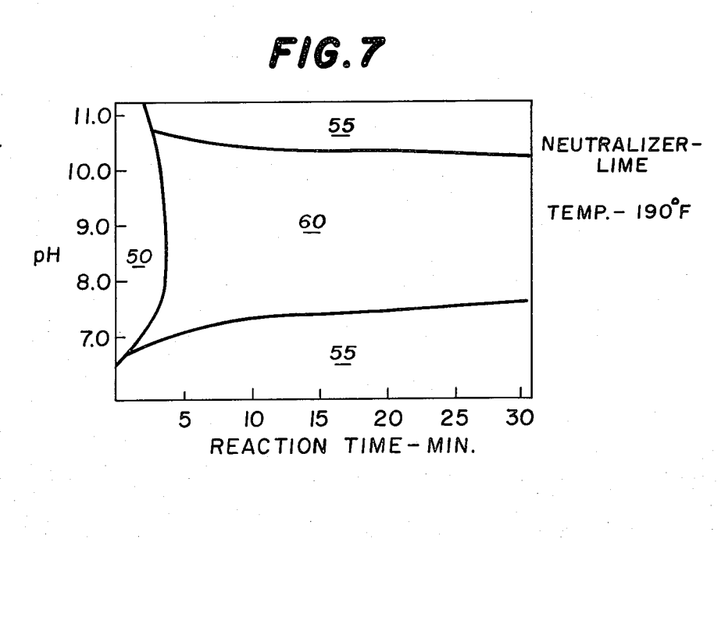
Figure 8:
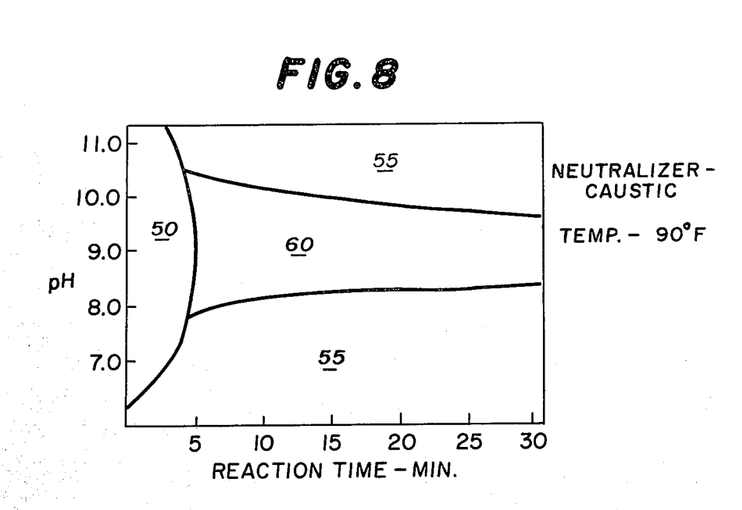
FIGS. 8 to 11 are similar graphical representations as FIGS. 4 to 8 for treating rinse water with sodium hydroxide.
Figure 9:
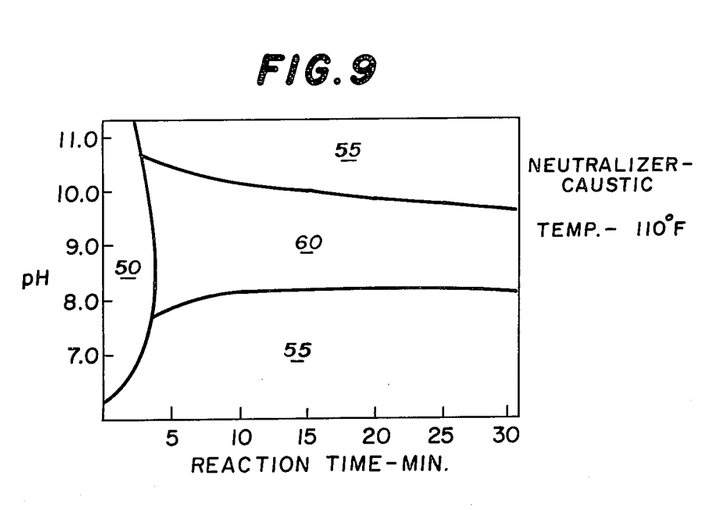

FIGS. 5, 6 and 7 also set forth data for the production of magnetite 60 by reaction with lime at various temperatures and pH values. The most satisfactory results occur with the temperature at 190°F. for at this temperature magnetite is produced when the pH is maintained in the range of from about 7.5 to about 10.5. Above or below that pH range, ferric hydroxide 55 is formed, an undesirable substance for the present system.

Figure 10:
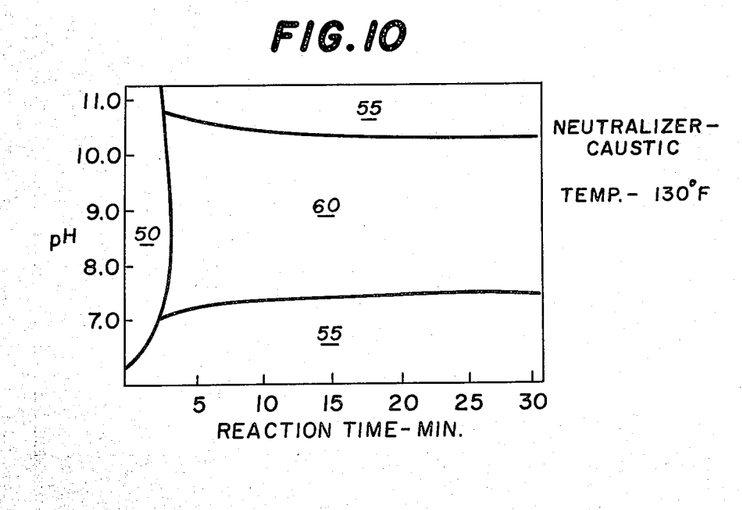
Figure 11:
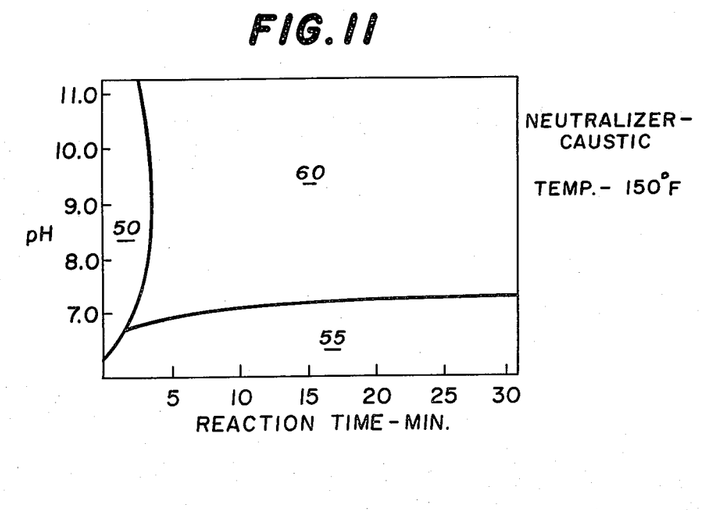

Referring now to FIGS. 8 through 11, data similar to that for the lime examples are illustrated wherein caustic in the form of sodium hydroxide in water solution was added to the iron chloride solution as a neutralizer therefor. As seen, the examples set forth are for temperatures of 90°, 110°, 130° and 150°F. Referring to FIG. 11 of the drawings, there is illustrated the results wherein the temperature was maintained at 150°F. As seen, there is no upper limit tested wherein the magnetite 60 is transformed into ferric hydroxide 55. This represents a significant difference from the prior art in that the use of caustic soda permits operation of an industrial process without the necessity of maintaining a rather narrow and critical pH range. An additional feature of the present invention is that the use of caustic soda permits lower operating temperatures, in this case 40°F. lower than the best results obtained using lime. A still further advantage of using caustic soda in lieu of lime and one which in this case is determinative of the operability of the process is that the lime must be added as a slurry rather than in water solution as is the sodium hydroxide. Slurries are notoriously difficult to handle and require much heavier pumping equipment and more expensive recovery equipment than necessitated by the use of water solutions of sodium hydroxide.

It is seen, therefore, that a process of treating rinse water obtained in rinsing metal strapping emerging from a hydrochloric acid bath has been disclosed which comprises adding sodium hydroxide to the rinse water and maintaining the rinse water at a pH of from about 7, as seen in FIG. 10, to greater than 12, as seen in FIG. 11, and at a temperature of from about 90°F. to upwards of 150°F., the magnetite being produced after about 5 minutes reaction time. The preferred process disclosed is where the rinse water is maintained at a temperature of about 150°F. and at a pH of about 10.5 to enable the iron content of the rinse water to be reduced from about 200 parts per million to about 20 to 25 parts per million in only 30 minutes. This process is a significant improvement with respect to any known process in the art.

Another feature of the present invention is the severe reduction in the amount of waste material produced with the present system. The process of the present system recycles clarified rinse water 175 to both the first rinse bath 120 and the second rinse bath 130 using the clarified water as a rinse for the emerging metal strapping in the first rinse bath and as a make-up solution for the second rinse bath. Recycling the clarified water 175 in this manner permits reusing the water previously processed and greatly reduces the amount of fresh make-up water 137 needed for the system 100 and the amount of waste discarded therefrom. For instance, in the present system 100 only 10 gallons per minute of fresh water 137 need be added to each separate line and is added as a final rinse for the strapping 105 emerging from the second rinse bath 130. Even for a system pumping in the order of 200 gallons per minute into the treatment tank only 70 gallons per minute of waste are produced, a figure made more impressive when it is realized that nearly 8400 gallons of liquid are being treated with sodium hydroxide at any one time. Finally, it should be noted that the flow of rinse water in the present system 100 is countercurrent to the movement of the metal strapping 105 therethrough and that the final rinse of fresh water 137 for the strapping 105 is directed at an angle toward the direction from which the strapping moves thereby to provide significantly improved clearing of the strapping 105 as it emerges from the final rinse tank 130.

In the context of this patent application, the term "metal strapping" includes sheet metal or metal strips up to 60 inches in width. Further, it should be understood that aeration of ferrous hydroxide takes place in both the tank 140 and the lines of the system to produce the magnetite.

While there has been described herein what is at present considered to be the preferred embodiment of the present invention it will be readily understood that various modifications and alterations may be made herein without seriously departing from the true spirit and scope of the present invention. It is intended to cover in the appended claims all such modifications and alterations which fall within the true spirit and scope of the described invention.

What is claimed is:

1. A system for rinsing metal strapping emerging from a hydrochloric acid pickling bath, said system comprising a first rinse bath and a second rinse bath in communication with said first rinse bath, a rinse water treatment tank in communication with said first rinse bath, a clarified water storage tank in communication with said rinse water treatment tank and with said first rinse bath and said second rinse bath, means for passing the metal strapping emerging from the hydrochloric acid pickling bath through said first rinse bath and said second rinse bath, means for rinsing the metal strapping emerging from said first rinse bath with clarified water from said clarified water storage tank, means for rinsing the metal strapping emerging from said second rinse bath with fresh water, mechanism for adding a sodium hydroxide solution to the rinse water from said first rinse bath, and means for removing precipitated magnetite from said rinse water treatment tank to maintain the liquid level in said rinse water treatment tank within predetermined limits, whereby a continuous system for rinsing metal strapping is provided with the introduction of fresh water thereto and the removal of waste material therefrom being limited.

2. The system set forth in claim 1, wherein means are provided to minimize the amount of liquid carried by the metal strapping from the acid tank into said first rinse bath.

3. The system set forth in claim 1, wherein the liquid flow from the second rinse bath into the first rinse bath is countercurrent to the direction of movement of the metal strapping.

4. The system set forth in claim 1, wherein means are provided to minimize the amount of liquid carried by the metal strapping from the first rinse bath into said second rinse bath.

5. The system set forth in claim 1, and further comprising means for maintaining said second rinse bath at a temperature of about 190°F. and at a pH above about 9.5.

6. The system set forth in claim 1, and further comprising means for maintaining the rinse water in said rinse water treatment tank at a temperature in the range of from about 150° to about 180°F. and the pH above 10.

7. The system set forth in claim 1, wherein said rinse water treatment tank is sized so that the rinse water is retained in said rinse water treatment tank for about 30 minutes to permit the iron content thereof to be reduced by precipitating magnetite therefrom.

8. The system set forth in claim 1, and further comprising receiving means in said rinse water treatment tank for receiving rinse water from said first rinse bath and for reducing the turbulence of the rinse water upon the introduction thereof into said rinse water treatment tank.

9. The system set forth in claim 1, and further comprising a baffle extending across said rinse water treatment tank near the exit thereof to prevent scum from flowing from said rinse water treatment tank into said clarified water storage tank.

10. The system set forth in claim 1, wherein a weir is provided intermediate said rinse water treatment tank and said clarified water storage tank to permit clarified water to flow over the weir from said rinse water treatment tank into said clarified water storage tank, and wherein said means for removing precipitated magnetite is at the bottom of said tank.

11. A system for rinsing metal strapping emerging from a hydrochloric acid pickling bath, said system comprising a first rinse bath and a second rinse bath in communication with said first rinse bath, a rinse water treatment tank in communication with said first rinse bath, a clarified water storage tank in communication with said rinse water treatment tank and with said first rinse bath and said second rinse bath, means for passing the metal strapping emerging from the hydrochloric acid pickling bath through said first rinse bath and said second rinse bath, means for rinsing the metal strapping emerging from said first rinse bath with clarified water from said clarified water storage tank, means for rinsing the metal strapping emerging from said second rinse bath with fresh water, mechanism for adding a sodium hydroxide solution to the rinse water from said first rinse bath, and pumping mechanism for removing precipitated magnetite from said rinse water treatment tank to maintain the liquid level in said rinse water treatment tank within predetermined limits, and control mechanism responsive to the level of clarified water in said clarified water storage tank for actuating said pumping mechanism to remove the precipitated magnetite from said rinse water treatment tank to maintain the level of rinse water in said rinse water treatment tank and the level of clarified water in said clarified water storage tank within predetermined limits, whereby a continuous system for rinsing metal strapping is provided with the introduction of fresh water thereto and the removal of waste material therefrom being limited.

12. The system set forth in claim 11, and further including a plurality of apertured conduits extending into said rinse water treatment tank at the bottom thereof in communication with said pumping mechanism for providing a flow bath for the precipitated magnetite.

13. The system set forth in claim 11, wherein said pumping mechanism includes two pumps, one on each side of said rinse water treatment tank for removing precipitated magnetite from both sides of the tank.

14. The system set forth in claim 11, wherein said control mechanism includes a float mounted in said clarified water storage tank for sensing the water level therein and actuating said pumping mechanism when the water level in said clarified water tank rises above a predetermined level and deactivating said pumping mechanism when the water level in said clarified water tank falls below a predetermined level.

15. A system for rinsing metal strapping emerging from a hydrochloric acid pickling bath, said system comprising a first rinse bath and a second rinse bath in communication with said first rinse bath, a rinse water treatment tank in communication with said first rinse bath, a clarified water storage tank in communication with said rinse water treatment tank and with said first rinse bath and said second rinse bath, means for passing the metal strapping emerging from the hydrochloric acid pickling bath through said first rinse bath and said second rinse bath, means for rinsing the metal strapping emerging from said first rinse bath with clarified water from said clarified water storage tank, means for rinsing the metal strapping emerging from said second rinse bath with fresh water, mechanism for adding a sodium hydroxide solution to the rinse water from said first rinse bath, and control mechanism responsive to the pH of the clarified water in said clarified water storage tank for controlling the amount of sodium hydroxide added to the rinse water to maintain the pH of the rinse water from said first rinse bath within a predetermined range, and means for removing precipitated magnetite from said rinse water treatment tank to maintain the liquid level in said rinse water treatment tank within predetermined limits, whereby a continuous system for rinsing metal strapping is provided with the introduction of fresh water thereto and the removal of waste material therefrom being limited.

* * * * *